United States Patent [19]
Chun

[11] 4,303,058
[45] Dec. 1, 1981

[54] PASSIVE SOLAR HEATING SYSTEM

[76] Inventor: Joo H. Chun, 845 S. Grand View St., Los Angeles, Calif. 90057

[21] Appl. No.: 104,967

[22] Filed: Dec. 18, 1979

[51] Int. Cl.³ .............................................. F24J 3/02
[52] U.S. Cl. .................................. 126/430; 126/431; 126/436
[58] Field of Search ............... 126/400, 429, 430, 436, 126/437, 431; 165/18, 53, 54, 55, 56, 57

[56] References Cited

U.S. PATENT DOCUMENTS

| | | | |
|---|---|---|---|
| 3,412,728 | 11/1968 | Thomason | 126/431 |
| 4,006,856 | 2/1977 | Nilsson | 126/430 |
| 4,029,258 | 6/1977 | Groth | 126/430 |
| 4,037,583 | 7/1977 | Bakun | 126/430 |
| 4,062,347 | 12/1977 | Jensen | 126/430 |
| 4,076,013 | 2/1978 | Bette | 126/430 |
| 4,108,155 | 8/1978 | Kolzumi et al. | 126/429 |
| 4,127,973 | 12/1978 | Kachadorian | 126/431 |
| 4,128,204 | 12/1978 | Wade | 126/430 |
| 4,139,321 | 2/1979 | Werner | 126/436 |
| 4,201,192 | 5/1980 | Coxon et al. | 126/430 |

Primary Examiner—Daniel J. O'Connor
Attorney, Agent, or Firm—William C. Conkle

[57] ABSTRACT

A solar heated, passive storage heater located in a floor between stories of a multistory building. A heat storage medium composed of a one-foot thickness of rock is supported by modular wall panels and a floor made from reinforced modular panels. A thermostat controlled blower forces solar heated air through conventional ductwork and ceramic conduits to the heat storage medium. Air return ducts carry air back to the solar heater. Heat is passively transferred to the building along both the bottom of a floor panel and the top of a slab on the upper surface of the heat storage medium. Reinforcement bars provide enough additional strength to the floor panel to support the heater.

6 Claims, 12 Drawing Figures

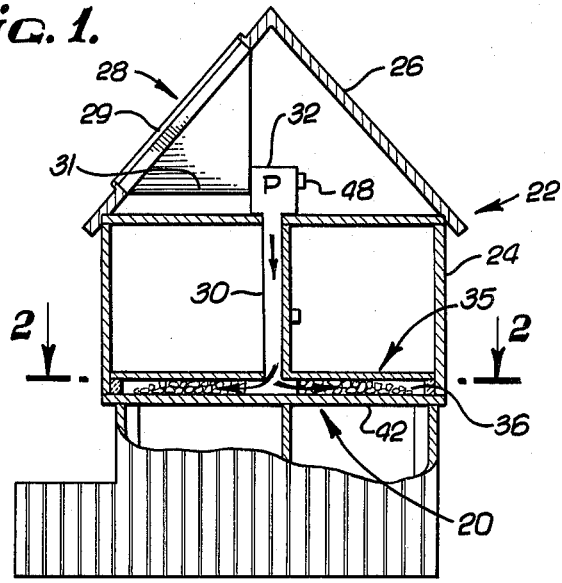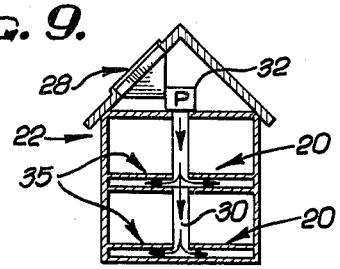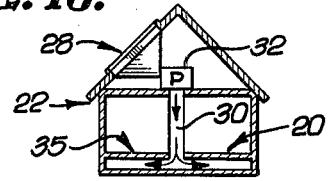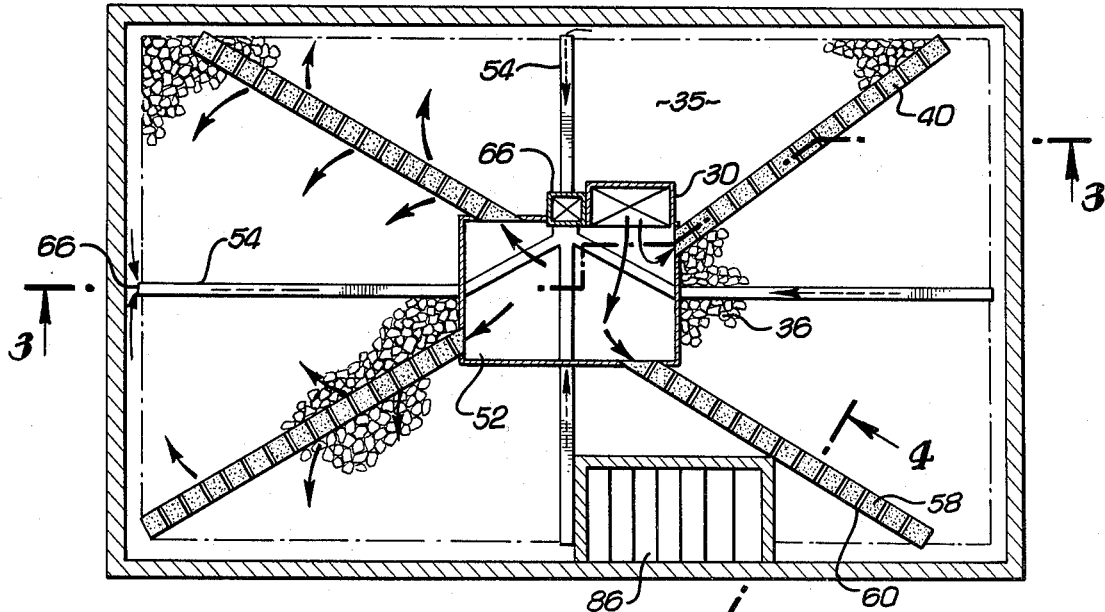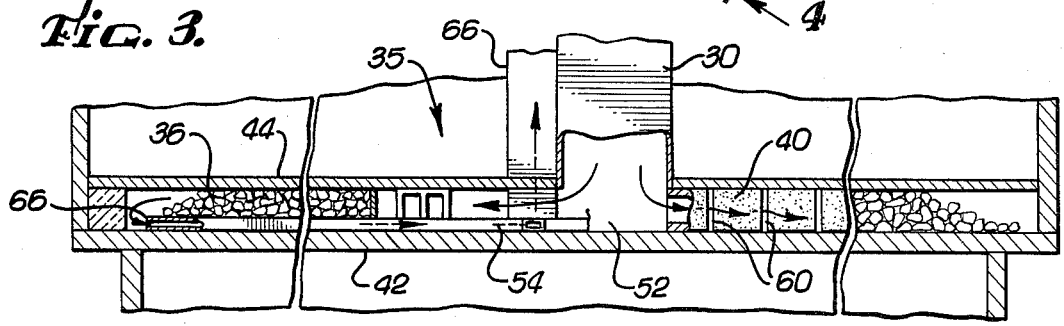

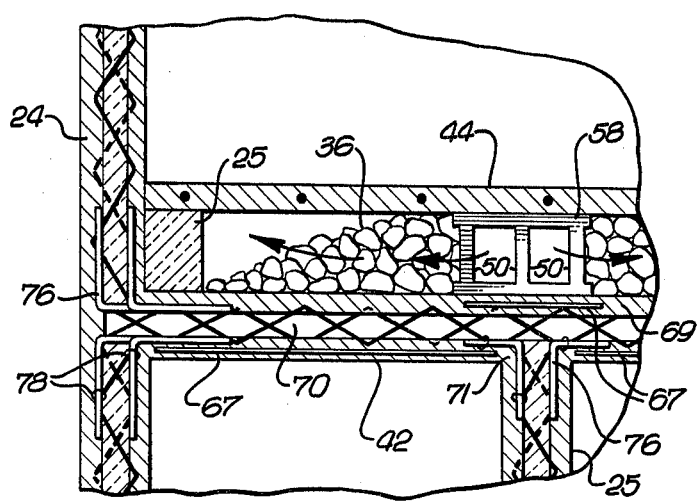
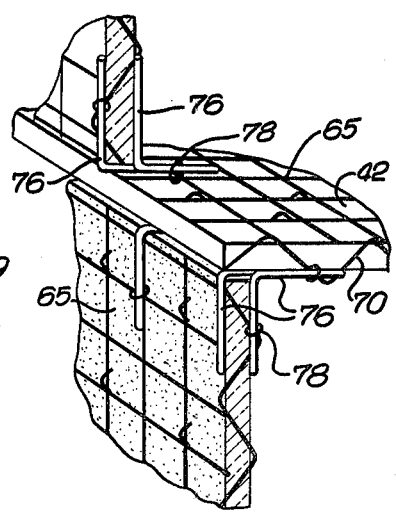
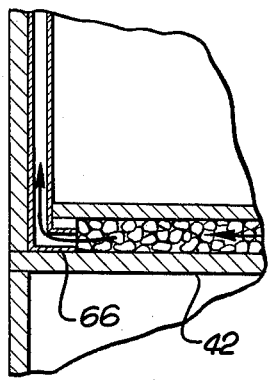
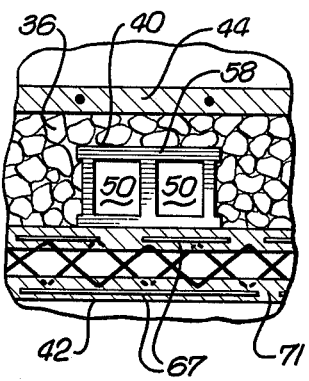
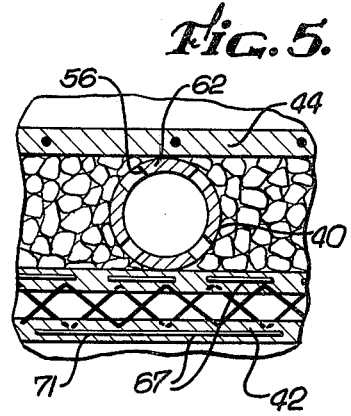
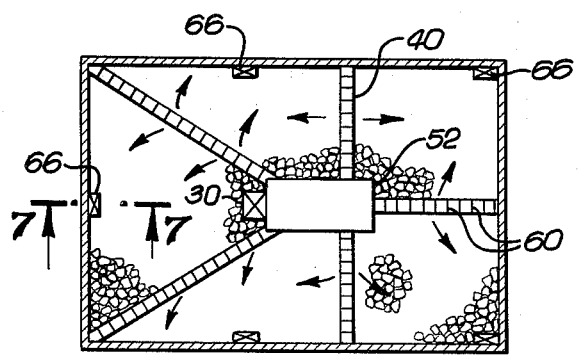
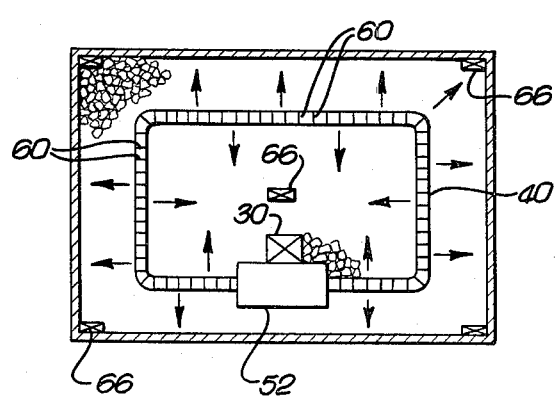

PASSIVE SOLAR HEATING SYSTEM

BACKGROUND OF THE INVENTION

The present invention relates generally to solar heating, and in particular to a passive heater located in a floor of a multistory building which can heat the rooms both above and below the floor-mounted heater.

Solar heating of buildings is well known in the prior art. Devices capable of heating air or water by using solar energy are commercially available. The devices can be used to heat a building by blowing the heated air directly into the rooms of the building. Alternatively, they can heat air or water which is directed into a heat storage medium that retains the heat it receives from the air or water. When a heat storage medium is to be heated, the air or water is kept in a closed loop which heats the medium, and the air that actually enters the rooms of the building, the heating air, is itself heated by the heat storage medium. The heating air is heated by being actively forced through the medium before it is conducted into the rooms that it itself heats.

The active system, described above, requires that the air that actually heats the rooms of the building be recycled through the heat storage medium by an energy consuming blower or pump. Further, the active system requires that costly and space-consuming ductwork and registers be placed in the building. Finally, the active system that blows warm air through registers does not actually heat the floors of the building nor does it effectively heat that portion of the room in the vicinity of the floors. Warm floors are, of course, desirable to persons who work, sleep or spend time on or near the floor of the building.

Heating systems utilizing heat storage mediums have, characteristically, had the heat storage medium located in the basement or ground floor. Such a location may be satisfactory in a one-story structure but in a multistory structure, that location necessitates long duct runs between the heat storage medium and the heat source and between the medium and the rooms to be heated. A more convenient location of the medium or one of the mediums, in the second story was traditionally thought to be impractical because it would apparently require a substantial strengthening of walls and floors of the the building to support the heavy heat storage medium.

Thus, there existed a need for a heating apparatus which could be powered by solar energy, which could heat the building passively without using hot air ducts, without registers and without the blowers associated with a forced air system, and which could be situated in a location above the ground or basement, for example, in the second floor of a residential building. Such an apparatus, ideally, should be reliable and be thermally efficient. It should suffer minimal heat losses, should be able to be built with inexpensive materials and labor-saving techniques, yet be strong, safe and capable of sustained use.

The present invention fulfills this need.

SUMMARY OF THE INVENTION

The invention provides a heating apparatus having a heater that is contained within the floor of a building and that warms the rooms above and below by heat transfer across the lateral surfaces of the floor and ceiling. The invention also provides a method of using a large and weighty heat storage medium located at a distance above the ground, for example, in the second story floor, in the passive heater of the heating apparatus. Finally, the invention provides construction materials and techniques used to construct a building containing the heater and a method of using those materials and other novel building techniques to construct the building containing the heater.

Briefly, and in general terms, the heart of the invention resides in a heat storage medium held in position between structural components of the floor. Ducts and conduits carry the air, that is used to heat the medium, from a remote heat source which preferably uses solar power to heat the air. The heat storage medium heats the structural floor panel beneath it and a slab overlying it and they, in turn, heat the building's rooms by heating the floor and ceiling of those rooms.

A conventional solar heat source in the roof of the building heats the air which is forced through ducts to the heat storage medium by a thermostatically controlled blower. A plenum and conduits having numerous holes in them carry and diffuse the heated air into the heat storage medium, which in the embodiments illustrated is rock. Air return pipes and ducts return the air back to the solar heater from the rock.

Improved construction materials and techniques permit the heater to be contained within an upper floor. These materials include modular building panels having longitudinal wire trusses and wire meshes forming their major lateral surfaces. Reinforcing bars are added to the floor panel, and the truss and mesh materials are enlarged and strengthened to enable the panel to resist moments induced in it when it is used in a span. A high strength cementitious covering is applied to the wall panels and floor panels after they are joined to form a strong integral structure that is capable of carrying both the dead load of the heater and slab, as well as the standard floor loading.

Other features and advantages of the present invention will become apparent from the following detailed description, taken in conjunction with the drawings, which illustrate, by way of example, the principles of the invention.

BRIEF DESCRIPTION OF THE DRAWINGS

FIG. 1 is a front elevational sectional view of a building embodying the novel features of the present invention, showing a solar powered source for heating air, a novel passive heating floor, and ducts for conducting heated air from the heat source to the heating floor.

FIG. 2 is a plan, sectional view of the floor taken generally along line 2—2 of FIG. 1 showing the location of a heat storage medium, a plenum, conduits, and an air return pipe lying within the floor and a stairwell.

FIG. 3 is a cross-sectional taken substantially along the line 3—3 of FIG. 2 showing the contour of the heat storage medium, and the interior of the plenum the conduits, and the air return pipes.

FIG. 4 is a fragmentary cross-sectional view taken substantially along line 4—4 of FIG. 2 showing a conduit made of cinder block and joints between wall panels and floor panels.

FIG. 5 is a cross-sectional view taken from the same perspective as FIG. 4 showing an alternative shape of conduit.

FIG. 6 is a generally schematic view taken from the same perspective as FIG. 2 showing an alternative arrangement of the plenum, the conduits and the air return pipes.

FIG. 7 is a fragmentary sectional view taken generally along line 7—7 in FIG. 6 showing an alternative embodiment of an air return.

FIG. 8 is a generally schematic view taken from the same perspective as FIG. 2 showing a third alternative arrangement of the plenum, conduits and air return pipes.

FIG. 9 is an elevational, partly cross-sectional view of a two-story building showing the novel heating floor apparatus located in both the first and the second floors.

FIG. 10 is an elevational, partly cross-sectional view of a single story building showing the novel heating floor apparatus located in the floor of the ground floor.

FIG. 11 is a fragmentary cross-sectional view taken from the same perspective as FIG. 4 and showing a different size of cinder block.

FIG. 12 is a perspective, fragmentary, partly sectional view of a partially completed joint such as is shown in FIG. 4 showing the wall panels attached to the floor panel by a plurality of dowels before the cement covering is applied.

DETAILED DESCRIPTION

As shown in the exemplary drawings, and in particular in FIG. 1, the invention is embodied in a structural floor 20 located in a closed building 22 of the type having walls 24 and a roof 26 that act together to keep out the elements and retain interior heat within the building. A source of heated air from a solar powered heating device, hereafter referred to as a solar heater 28, or from a furnace or heat pump or other source provides heat to warm the interior of the building 22. Supply ducts 30 and air blowers 32 carry the heated air, in a flow, to heat storage medium 34, such as rocks 36 or water (not shown). The heat storage medium 34 when it is heated by the air acts as a reservoir of heat energy. The heat storage medium 34 lies atop a floor panel 42 that supports both the medium 34 and a series of conduits 40 which carry the heated air from the supply ducts 30 into the heat storage medium 34. A slab 44 covers the heat storage medium 34 and also acts as the load bearing floor surface of the room above the heat storage medium.

In accordance with the present invention, the passive heater assembly 35 is contained between the load bearing floor panel 42 and the reinforced floor slab 44, and the heat storage medium 34 as well as the floor panel and the slab are heated by a flow of heated air that escapes from the conduits 40 and passes throughout the heat storage medium. In turn, the heater assembly 35 warms the interior of the building by heating that occurs along the top of the slab 44 and the bottom of the floor panel 42 and warms and rooms above and below the heater assembly 35. Structural walls 24 and floors 20 made of modular building wall panels 44 and modular floor panels 42 support the heater assembly 35 between the floors of a two story building 22. The invention includes a method of heating using a passive heater and a method of constructing a building incorporating such a heater by interconnecting reinforced modular building panels and covering them with a cementitious mixture that give them additional strength. The materials and method of construction permits the construction of a structure incorporating the apparatus in the ceiling of its first story.

The novel location of the heat storage medium 34, positioned above the ground, greatly increases the efficiency of the passive heater assembly 35 by permitting both of its lateral surfaces to heat the interior of the building 22. The resulting increase in heating efficiency permits the elimination of energy consuming fans and blowers that were previously used to force air over the heat storage medium 34.

As will be described below more completely, the building 22 containing the present invention can be conventional in size and shape and it can be built using conventional framing and construction methods. By using the modular building panels of the type shown by my U.S. Pat. No. 4,253,288, called Chun panels in this application, and the improved construction techniques described in that application and others described below, a building 22 containing the present invention can be efficiently and inexpensively built using commercially available materials and supplies, as well as modern labor-saving devices and techniques.

Turning to the drawings, FIG. 1 shows the heater assembly 35 in the ceiling of the second floor of a two-story structure such as a residential building 22. Conventional heating ducts 30 carry warm air from a remote heat source 28. A solar heater 28 of conventional design, such as one in which translucent fibreglass panels and polyester film 29 replace part of the convention roof 26 and transmit sunlight to heat producing black collector 31, is used to produce a supply of heated air. Of course, other sources of heated air, such as heat pumps (not shown) can be used. An air blower 32 forces the warmed air from the heat source 28 to the heater assembly 35. Blower 32 operation is controlled by a thermostat 48 which senses the temperature of the heated air and the temperature of the air near the floor panel 42 and/or slab 44.

Presently, the preferred material for the heat storage medium 34 is rock 36, each rock being generally between two and three inches diameter. Rock 36 has a relatively high specific heat; it is stable, inert, and inexpensive. While water (not shown) is also a satisfactory heat storage medium, it can evaporate and could leak from its container and thereby cause damage to the building. One advantage of rock 36 over water is that small, gravel-free, uniform sized rocks will permit heated air to flow around and between adjacent rocks thereby heating the medium 34. The chief advantage of rock 36 over water is the cost savings. The expensive water container required for a system using water as a heat storage medium raises the cost of the water system to an amount at least twice the cost of a system using rock.

The heated air is carried to and throughout the heat storage medium 34 in a network as is shown in FIG. 2, that includes a rectanguarly shaped plenum 52, a plurality of conduits 40, and several air return pipes 54, all of which act to diffuse the heated air throughout the heat storage medium. Each conduit 40 should, preferably, contain an air passage space 50 having a large cross-sectional area that will permit air to flow through it at a low differential pressure. The conduits 40 should have a plurality of orifices 56, sized to permit an escape of heated air that is uniform along the length of the conduit. A uniform escape of air produces a uniform air flow throughout the heat storage medium 34. An excellent conduit 40 can be constructed by placing ordinary concrete cinder blocks 58 side by side as is illustrated in FIGS. 2, 4, and 11. Such cinder blocks 58 have a height of at least eight inches (as is illustrated in FIG. 11) or twelve inches (as is illustrated in FIG. 4) and have axial openings whose major axes measure at least five inches by two inches. The orifices 56 result from leaving a small gap 60 between adjacent blocks 58. A pipe 62 as is shown in FIG. 5 made of metal or transite and having the orifices 56 would also be satisfactory.

Air is withdrawn from the heat storage medium for recirculation back to the heat source 28 through return air pipes 54. Inlets 66 to these return air pipes 54 preferably are located at the greatest possible distance from the conduits 40, so that the heated air will transverse the entirety of the heat storage medium 34. The return air pipes 54 can be joined to form one or more larger return air ducts 64 which carry air back to the heat source 28. FIGS. 2, 6, and 8 show respectively: inlets 66 placed equally distant from diagonally placed conduits 40; inlets placed equidistantly from irregularly placed conduits; and inlets placed in the center and corners of the floor 20.

After the plenum 52, the conduits 40, the return air pipes 54 and a stairwell 86, if necessary are installed, the heat storage medium 34, here rock 36, can be added. When rock 36 is used, the volume between the floor panel 42 and the slab 44 can be filled either partially as is shown in FIG. 4 or completely as is shown in FIG. 7. Partial filling reduces the dead load on the floor panel 42 and minimizes lateral forces acting on the wall 24 adjacent to the rock 36. Thus, partial rock filling is presently preferred to complete filling.

When the present invention is in operation, the thermostat 48 senses a sufficient differential between temperatures of the air in the remote heat source 28 and the air adjoining the floor 20 and at a preset differential it can activate the blower 32. Heated air is forced through the heat storage medium 34 where it gives off its heat before it is returned via the return air pipes 54 and ducts 64 to the heat source 28. The heat storage medium 34 warms the adjacent floor panel 42 and slab 44 both of which in turn heat the air and furnishings with which they are adjacent or in contact. This floor heating makes the space near the floor more comfortable to use because it warms that air which otherwise would be the coldest air in the room.

The Chun panel, as is best seen in FIG. 4, is preferably used without any insulation being placed in a space 72 located between cement retaining sheets 68 disposed parallel to the major lateral surface of the panel and formed of fabric generally impervious to a flow of liquid. Instead, that space 72 is left vacant and the truss wires 70, which will be described more completely below, that pass through the vacant space are covered with a rust-resistant material, such as paint. As can best be seen in FIG. 4, a portion of the building wall 25 adjacent the heat storage medium 34, can be reinforced to improve the wall's ability to resist the lateral forces that may be imposed upon it by the heat storage medium 34.

The heat storage medium 34 can be supported by walls 24 and floors 20 built using commercially available building panels. However, reinforcement must be added to the panels used for the floor 20 to enable the floor to support the heater assembly 35. Surprisingly, a one foot thickness of rock 36 weighs only about ninety psf, an amount which is less than the standard for snow-induced roof loads that is required in many localities. The entire heater assembly 35, including the rock 36, the slab 44, or the reinforced floor panel 42 weighs only about 160 psf.

Chun panels can be used, without additional reinforcement, to construct load bearing walls 24 that will have sufficient strength to support the invention. Chun panels, reinforced as described below, can be positioned horizontally and used as the floor panels 42 that form the spans of the floor 20. The floor panels 42 and the wall panels 46 are attached to one another with bent dowels 76, shown in FIGS. 4 and 12, which are connected to the meshes 65 of the panels by a series of ties 78. By spraying the panels with a cementitious mixture of portland cement and sand that is capable of compressive strengths up to 4,000 psi, the compressive wall strength of 1,500 psi necessary to support the invention can be achieved.

Chun panels do not have a sufficient moment resisting strength to comply with the 1979 Uniform Building Code if they were used for floor spans without additional reinforcement being added. By replacing the trusses 70 in the Chun panel with larger wires, for example by replacing a 12 guage (nominal diameter of 0.1055 inches) truss with a 10 guage (nominal diameter of 0.135 inches) truss, and by decreasing the stirrup spacing in the truss, and finally by increasing the vertical component of the truss from about $3\frac{3}{8}$ inches to about 6 inches, the moment resisting strength of the panel can be significantly increased. Similarly increasing the thickness of the wire forming the lateral meshes 65 between which the trusses 70 run, increases the panel's moment resisting strength.

By increasing the size of the truss 67 and mesh wires 65 and by adding reinforcement bars 67, described below, sufficient moment resisting strength can be obtained to enable a Chun panel covered with the cementitious mixture to support the total floor dead load. The dead load includes a partially cement covered $5\frac{3}{8}$ inch thick Chun panel used as a floor panel 42, a solid $2\frac{1}{2}$ inch thick concrete slab 44 and a 12 inch thickness of rock used as a heat storage medium 34 through which the conduits 40 and the air return pipes 54 pass.

The reinforced panels 42, the rock 36, and slab 44, all combined, produce a floor dead load of about 159 psf. When a system load of an additional 146 psf is added to the above dead load and a safety factor of 1.4 is used, engineering calculations reveal that additional reinforcement in the panel such as reinforcing bars 67 is needed. Those calculations, set forth here by way of example and for which all warranties of any kind and each and every other liability are disclaimed, reveal that if certain modifications are made to a Chun type floor panel 42, it can support the combined dead and system loads across a twelve foot span. These modifications in the panel include installing in the lower cement-covered compartment 71 of the floor panel 42 No. 4 reinforcing bar 67, placed at six inch centers, so that the extends completely across the span, using twelve guage wire for the truss wires 70, and using fourteen guage wire for the mesh wires 65 in the panel. If in a floor panel 42 ten guage wire were used for a truss 67 that had a six inch vertical component, and twelve guage wire were used for the mesh 65, and No. 4 reinforcing bar 67 on six inch centers was incorporated into the lower compartment 71 of the panel the panel could make a sixteen foot span without intermediate support.

When certain components and reinforcing methods are used in the floor panel 42, the span that the panel may safely make may be shorter than the distance between the outside walls 24 of the building 22. When that occurs, the floor panel 42 must receive additional support from a post (not shown) or an interior wall 25 as is shown in FIG. 4. When the floor panels 42 rest on an intermediate support wall 25, the reinforcing bars 67 that extend across the span in the lower compartment 71 and act to resist negative moments induced in the panel, must be supplemented with shorter reinforcing bars 67 placed in the upper cement covered compartment 69 of the panel that can resist the positive moments induced in the panel by the support wall 25. The upper reinforcing bars 67 are centered above the interior wall 25 and extend across about one third of the length of the span.

The installation of the passive heater assembly 35 of the present invention in the building 22 can be accomplished in a number of ways using Chun panels. In one method, a horizontal floor panel 42 is joined between vertical wall panels 46 using a series of bent dowels 76 as is shown in FIG. 12. The bent dowels 76 are attached to the meshes 65 of the floor panel 42 and the wall panels 46 by a series of wire ties 78. All the surfaces of both the floor panel 42 and both sides of the wall panel 46 are then sprayed with the cementitious mixture that covers them and forms them into a monolithic structure whose compressive strength results in great measure from the cementitious covering. There are, of course, additional alternative methods of joining the panels that can be used as desired. These methods include joining the meshes 65 of the lower wall panel 46 to the meshes of the floor panel 42 and placing in that joint a U-shaped steel rod 82. The upper wall panels 46 can later be connected to the steel rods 82 and then covered with the cementitious mixture.

Once the floor panel 42 is in place and the reinforcing bar 67 and cementitious mixture have been applied, the heater assembly 35 including the plenum 52, the conduits 40, and the heat storage medium 34, can be positioned atop the floor panel 42. As described above, the rock 36 forming the heat storage medium 34 here is installed to a thickness of about one foot. The reinforced floor panel 42 is about 5⅜ inches thick. A rib lathe 84 is placed over the heater assembly 35 components and the 2½ inch thick concrete slab 44 is poured onto the rib lathe 84 completing the floor assembly.

FIGS. 6 and 8 illustrate alternative embodiments of the invention in which the plenum 52, the conduits 40, and the return inlets 64 are located in locations different from those shown in FIG. 2. The alternative embodiments can be used when floor loading considerations or restrictions on the placement of duct work makes certain configurations undesirable. The configurations illustrated are by no means inclusive, but merely show several possibilities. In designing and constructing any alternative configuration, it is desirable that the conduits 40 and the inlets 66 be positioned so that heated air will pass uniformly throughout the heat storage medium 34 and thereby produce in the heat storage medium a uniform temperature.

FIGS. 9 and 10 show alternative embodiments of the present invention in which the heater assembly 35 is placed in different locations in the building. In FIG. 9, two heat storage mediums 34 are located in the building 22, one in the ground floor and one in the floor of the second-story. FIG. 10 shows a one-story building in which the heat storage medium 34 is placed in the ground floor.

From the foregoing, it will be appreciated that the present invention provides a passive heating system and method of using it, that is capable of heating the floor 20 of any story of a building 22, including an upper story, and is also capable of heating the ceiling of any room that it overlies. The invention includes construction components as well as methods of construction that permit the quick and inexpensive construction of a building 22 containing the present invention. The heater assembly 35 makes it possible to use passive solar heating in all stories of a building 22. Such passive heating is uniform and continuous and it eliminates the need for energy consuming blowers that must be used in an active heater to blow air across the heat storage medium 34 to heat the air. The invention also provides an economical means of heating that portion of a room, in the vicinity of the floor, that is normally difficult to heat by conventional methods and it makes working, sleeping, or being on or near the floor more comfortable.

While several forms of the invention have been illustrated and described, it will also be apparent that various modifications can be made without departing from the spirit and scope of the invention.

I claim:

1. In a building, a heating apparatus that heats said building, at least partially by a passive heater contained in a floor of the building that is located at a location above the ground, said heating apparatus comprising:
   a floor structure having a vacancy within its interior;
   a solar powered heat source for heating a flow of air to a temperature that exceeds the ambient temperature of the air surrounding said floor;
   a solid heat retaining medium within said vacancy, said medium being of the type capable of accepting heat from said flow of air and being positioned to permit said flow to permeate throughout said medium;
   means for diffusing said flow throughout said heat retaining medium, said diffusing means including a pump for producing a supply of super-atmospheric pressurized heated air, and a conduit for carrying said flow of heated air throughout said heat retaining medium;
   a plurality of panels of the type having at least one mesh forming a major lateral surface and having truss members connected to said mesh and joining said major lateral surfaces, said panels being disposed vertically and interconnected to one another to form wall;
   at least one panel of the type having at least one mesh forming a major lateral surface and having truss members connected to said mesh and joining said major lateral surfaces said panel being disposed horizontally to and connected to said vertical walls to form a floor member therebetween, said horizontal panel having portions outward of said mesh, adapted to secure reinforcing bars which resist force moments induced in said panel, said connection between said wall and floor panels including a plurality of bent dowels whose ends are attached to said meshes of said vertical and horizontal panels, all of said panels being covered with a cementitious mixture of portland cement and sand.

2. The apparatus described in claim 1 wherein, said heat retaining medium is comprised of a plurality of pieces of solid matter of sized to produce a somewhat homogenous fill in said vacancy.

3. The apparatus as described in claim 1 further comprising:
   at least one plenum from which extend said conduits that pass through said heat retaining medium;
   at least one air supply duct extending from said heat source to said plenum; and at least one air return pipe extending from said heat storage medium to said heat source for returning air to said heat source.

4. The apparatus as described in claim 1, wherein said conduit is formed from a plurality of concrete cinder blocks disposed side to side with a gap existing between adjacent blocks.

5. The apparatus as described in claim 1, wherein said conduit is a pipe having a plurality of orifices therethrough spaced along its length.

6. The apparatus as described in claim 1 wherein:
said conduit has an air passage whose cross-sectional area exceeds twelve square inches and said conduit has a plurality of orifices along its length to permit air to escape from said air passage.

* * * * *